United States Patent
Yau

(10) Patent No.: US 10,698,822 B1
(45) Date of Patent: Jun. 30, 2020

(54) SYSTEMS AND METHODS FOR REDUCED LATENCY IN DATA EXCHANGE WITHIN SHARED MEMORY WITH COHERENT CACHE MEMORIES

(71) Applicant: Johnny Yau, Providence, RI (US)

(72) Inventor: Johnny Yau, Providence, RI (US)

(73) Assignee: Johnny Yau, Providence, RI (US)

( * ) Notice: Subject to any disclaimer, the term of this patent is extended or adjusted under 35 U.S.C. 154(b) by 50 days.

(21) Appl. No.: 16/184,490

(22) Filed: Nov. 8, 2018

Related U.S. Application Data

(60) Provisional application No. 62/585,153, filed on Nov. 13, 2017.

(51) Int. Cl.
*G06F 12/08* (2016.01)
*G06F 12/0808* (2016.01)

(52) U.S. Cl.
CPC .. *G06F 12/0808* (2013.01); *G06F 2212/1044* (2013.01)

(58) Field of Classification Search
CPC ............... G06F 12/08; G06F 12/0808; G06F 2212/1044; G06F 12/0862; G06F 12/0875
USPC ........................................................ 711/141
See application file for complete search history.

(56) References Cited

U.S. PATENT DOCUMENTS

| | | | | |
|---|---|---|---|---|
| 5,276,848 A | * | 1/1994 | Gallagher | G06F 12/0897 711/121 |
| 5,787,486 A | * | 7/1998 | Chin | G06F 12/0888 711/113 |
| 6,122,696 A | * | 9/2000 | Brown | G06F 13/4018 710/307 |
| 6,678,798 B1 | * | 1/2004 | Kuskin | G06F 12/0817 711/119 |
| 6,895,475 B2 | * | 5/2005 | Volpe | G06F 12/0862 711/137 |
| 6,915,387 B1 | * | 7/2005 | Huffman | G06F 12/0822 711/119 |
| 6,918,009 B1 | * | 7/2005 | Sato | G06F 12/0815 711/137 |
| 2005/0108481 A1 | * | 5/2005 | Iyengar | G06F 12/0817 711/141 |
| 2008/0147991 A1 | * | 6/2008 | Clark | G06F 12/0831 711/146 |
| 2009/0113139 A1 | * | 4/2009 | Pudipeddi | G06F 12/0817 711/146 |
| 2009/0216951 A1 | * | 8/2009 | Shum | G06F 9/3851 711/124 |
| 2010/0268884 A1 | * | 10/2010 | Cummings | G06F 12/0822 711/122 |
| 2011/0202726 A1 | * | 8/2011 | Laycock | G06F 12/0815 711/122 |

\* cited by examiner

*Primary Examiner* — Mano Padmanabhan
*Assistant Examiner* — Jean C Edouard
(74) *Attorney, Agent, or Firm* — Troutman Sanders LLP; James E. Schutz; Christopher C. Close, Jr.

(57) ABSTRACT

A system for writing to a cache line, the system including: at least one processor; and at least one memory having stored thereon instructions that, when executed by the at least one processor, controls the at least one processor to: pre-emptively invalidate a cache line at a reader device; receive, from the reader device, a read request for the invalidated cache line; delay a response to the read request; and after the delay, output for transmission a response to the read request to the reader device.

18 Claims, 12 Drawing Sheets

SYSTEMS AND METHODS FOR REDUCED LATENCY IN DATA EXCHANGE WITHIN SHARED MEMORY WITH COHERENT CACHE MEMORIES

CROSS-REFERENCE TO RELATED APPLICATIONS

This application claims the benefit of U.S. Provisional Application No. 62/585,153, filed Nov. 13, 2017.

BACKGROUND

Modern computer systems include distributed cache memories to speed access to memory shared among multiple components in a system. The shared memory systems that include cache memories typically utilize a cache coherency protocol such as MOESI, MESI, MESIF, or other related cache coherency protocol. As will be understood by one of ordinary skill, under these protocols, cache lines may be assigned (and transition between) various different states, such as "Modified" ("M"), "Exclusive" ("E"), "Shared" ("S"), "Invalid" ("I"), "Owned" ("O"), and "Forward" ("F"). The protocols are designed to arbitrate shared memory utilization in a coherent and consistent manner among multiple components in the presence of distributed caches memories.

Shared memory can be logically organized into units called cache lines. Copies of a particular cache line may be present in multiple components' local cache memories. In many implementations of cache coherency, to maintain coherency and consistency, the protocols require that a component intending to write to a cache line first notify all other components (or a directory) in the system of the component's intent to write to the cache line and then confirm that the component has the only writable copy of the cache line in question. Put differently, the component must gain "Modified" (also commonly referred to as "Dirty") or "Exclusive" (also commonly referred to as "Valid") state on its own local copy of the cache line. In the research literature, this technique is commonly called "invalidation." Note that invalidation may be in the form of explicit invalidation or implied in actions such as, but not limited to, read for exclusive control. Modified ("M") and Exclusive ("E") states share a property—the writer with a local copy of a cache line in those states is the only component in the system that has permission to write to the cache line if the system's shared memory is to stay coherent and consistent.

When writing is initiated and the writer's local copy of the relevant cache line is not already in the M or E state, the write is delayed by "coordination overhead" wherein the system expends time and resources granting M or E state to the writer's local copy of the cache line. This coordination overhead therefore increases "Observed Latency" (i.e., the time which elapses between when the writer initiates a write to a cache line and when the data is permitted to be read from that cache line). In the related art, a writer can pre-emptively invalidate all remote copies so as to hide the coordination overhead therein reducing Observed Latency. For many workflows, pre-emptive invalidation (i.e., "write prefetch") is effective. However, once a reader requests a cache line that has been invalidated pre-emptively and the request is granted prior to the writer initiating its write, the pre-emptive invalidation becomes wasted work because granting the reader's request moves the writer's copy of the cache line out of M or E state. In this scenario, the writer must again incur the coordination overhead at a future time when it wants to initiate a write and consequently will have wasted resources in the system in its unused pre-emptive invalidation. Generally, pre-emptive invalidation approaches known in the related art result in wasted work and therefore is not implemented.

Embodiments of the disclosed technology address the issues mentioned above and lowers the latency experienced in data transfers within a shared memory architecture in the presence of distributed cache memories.

SUMMARY

According to some embodiments, there is provided a method for reducing observed write transaction latency of a writer in a cache coherent shared memory system, the method including: pre-emptively invalidating a cache line; receiving a read request for the invalidated cache line; temporarily withholding a response to the read request; responding, after temporarily withholding the response, to the read request; and pre-emptively re-invalidating the cache line after responding to a read request.

Temporarily withholding the response to the read request may include withholding the response until the writer writes fresh data to the cache line.

The method may further include determining that the writer has interest in the cache line, wherein temporarily withholding the response to the read request comprises withholding the response until the writer indicates that it is no longer interested in the cache line.

Temporarily withholding the response to the read request may include withholding the response until a timeout occurs.

The timeout may be based from a time of pre-emptively invalidating the cache line. The timeout may be based from a time of receiving the read request.

The method may further include aborting the timeout in response to the writer determining that a write command to the cache line is unlikely to occur during the timeout period.

The timeout length may be based on at least one from among a historical rate of data write commands to the cache line, a historical frequency of read requests for the cache line, and an estimated fabric delay between the writer and the reader.

The method may further include temporarily delaying the pre-emptive re-invalidation based on historical read requests rates.

According to some embodiments, there is provided a method for reducing the amount of wasted work done by a reader in a cache coherent shared memory system capable of out-of-order processing polling on a cache line, the method including: speculatively invalidating a cache line; receiving, by a writer, a read request for the invalidated cache line; and withholding, by the writer, a response to the read request until a condition is met.

The method may further include speculatively re-invalidating the cache line again after responding to the read request due.

The condition may include a first from among the writer writing useful data to the cache line, determining that the writer is no longer interested in holding the cache line, and a timeout occurring.

According to some embodiments, there is provided a system for writing to a cache line, the system including: at least one processor; and at least one memory having stored thereon instructions that, when executed by the at least one processor, controls the at least one processor to: pre-emptively invalidate a cache line at a reader device; receive, from the reader device, a read request for the invalidated cache line; delay a response to the read request; and after the delay, output for transmission a response to the read request to the reader device.

The instructions, when executed by the at least one processor, may further control the at least one processor to pre-emptively re-invalidate the cache line at the reader device after responding to a read request.

The instructions, when executed by the at least one processor, may further control the at least one processor to delay the pre-emptive re-invalidation based on historical read requests rates.

Delaying the response to the read request may include delaying the response until at least one of the system writes fresh data to the cache line and the system is no longer interested in the cache line.

Delaying the response to the read request may include delaying the response until a timeout occurs.

The timeout may be based from either a time of pre-emptively invalidating the cache line and a time of receiving the read request.

The instructions, when executed by the at least one processor, may further control the at least one processor to about the timeout in response determining that a write command to the cache line is unlikely to occur during the timeout period.

The instructions, when executed by the at least one processor, may further control the at least one processor to determine a timeout length based on at least one from among a historical rate of data write commands to the cache line, a historical frequency of read requests for the cache line, and an estimated fabric delay between the system and the reader device.

BRIEF DESCRIPTION OF THE FIGURES

Implementations, features, and aspects of the disclosed technology are described in detail herein and are considered a part of the claimed disclosed technology. Other implementations, features, and aspects can be understood with reference to the following detailed description, accompanying drawings, and claims. Reference will now be made to the accompanying figures and flow diagrams, which are not necessarily drawn to scale.

DETAILED DESCRIPTION

Figure 1:
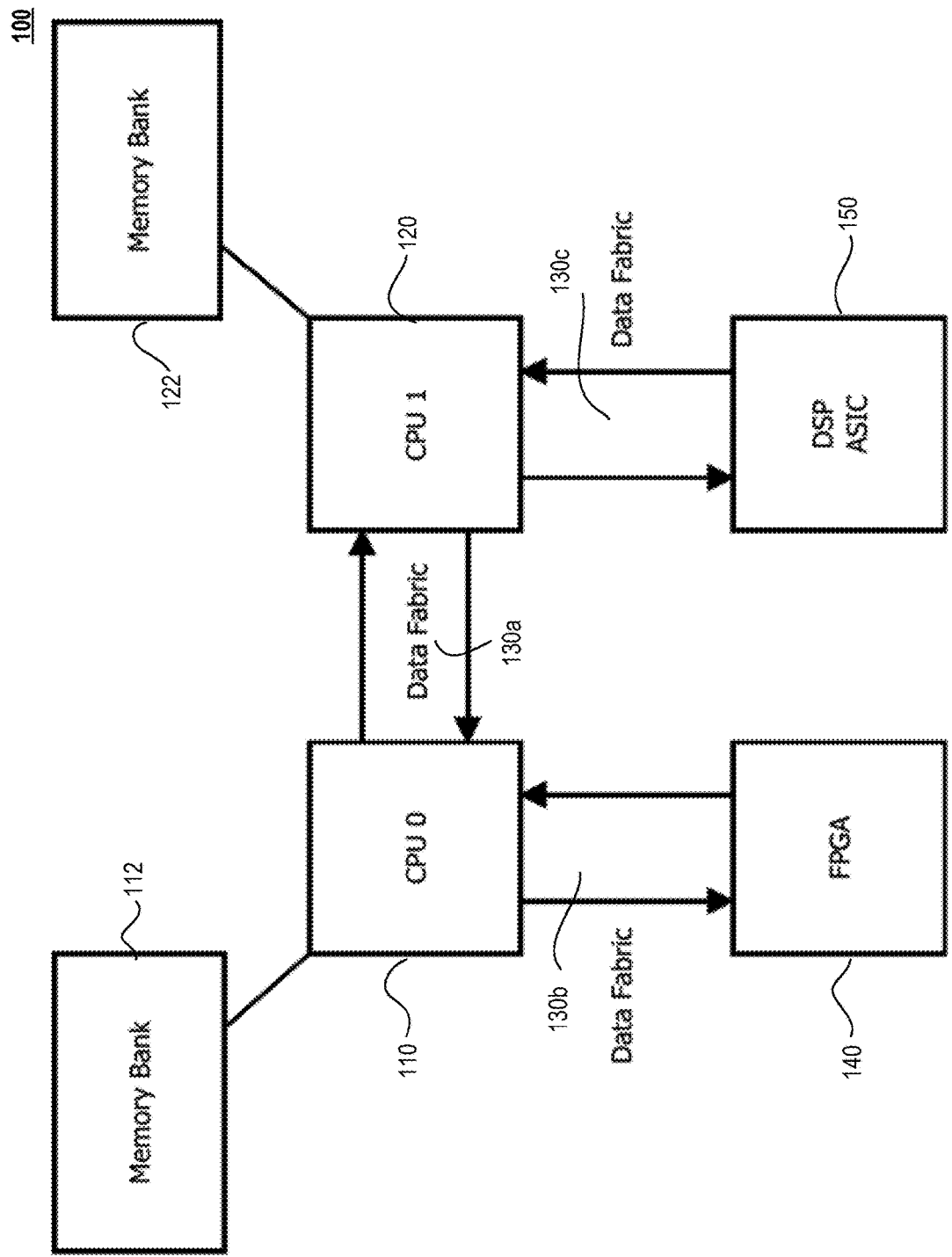
FIG. 1 offers an overview of a conventional computer architecture in which first and second CPUs can exchange data using a point-to-point processor interconnect or "data fabric".

A related art scheme for exchanging data between two components in a shared memory system is to have the reader constantly poll a particular memory location until the writer updates the memory location and indicates that it is safe for the reader to proceed. Sample implementations make use of spin locks, semaphores, ring buffers, and indicator flags among other techniques. It will be appreciated that in the presence of a continuously polling reader, the writer's local copy of the contended cache line will rarely be in an M or E state at the moment the writer initiates a write because the writer's responses to the frequent read requests move, or "downgrade," the writer's local copy of the cache line out of either of these two states. Therefore, a write initiated by the writer almost always requires it to first gain M or E state for its local copy of a cache line. As explained, this process involves invalidating all other copies of the cache line in the system thereby incurring a coordination overhead which increases the Observed Latency of writer-to-reader data transfer relative to the case in which the writer's local cache line is already in M or E state. Further, the reader's polling needlessly consumes instruction execution resources. Accordingly, the related art's approaches to reducing latency have various technical drawbacks.

The disclosed technology hides coordination overhead typically required by a cache line write by speculatively and pre-emptively undertaking the steps necessary to acquire a M or E state. As such, it reduces Observed Latency of cache writes. In some implementations, anticipating that a polling reader will soon request the latest updated copy of the cache line in a M or E state, the writer unilaterally withholds the response to a read request regardless of whether or not there is data to be written until the first to occur of (i) a predetermined amount of time has elapsed or (ii) the writer allows the read request to be processed. In the case of (i), the writer relinquishes the M or E state because otherwise the reader will infer that an error has occurred. Additionally, after responding to the reader, because the writer is still interested in the cache line just relinquished, the writer will again undertake the steps necessary to acquire an M or E state speculatively. In the case of (ii), the writer has determined that it no longer requires the cache line and therefore does not re-initiate invalidation. The writer does not re-initiate invalidation because it is done with the write and wants to make the updated cache line available to be read or it has determined that the write is no longer necessary.

Typically, a polling reader, upon learning that its local copy of a particular cache line, has been invalidated by a writer, will generally send another read request immediately. In conventional schemes, the writer typically responds immediately to a read request and relinquishes the M or E state that its local copy of the cache line has just gained. Therefore, a potential write only has a fleeting moment to catch the cache line in a M or E state so that it can successfully finish its write. By withholding its response to a read request, the writer increases its window of opportunity for a fast finish of a write thereby avoiding the coordination overhead and associated extra latency of acquiring a M or E state. It will be appreciated that in practice, the held-up read response is treated by the reader as an abnormally delayed reply. As such, typically no modification to the logic in the reader is required to maintain interoperability with writers that can withhold read requests. Additionally, since most modern processors are able to execute instructions out-of-order and/or execute multiple threads simultaneously (e.g., SMT and Hyperthreading), a reading processor which is not validating the value read is not expending resources executing useless instructions. This frees up processor resources to execute useful instructions while waiting for the held-up read response to arrive.

In cache coherency protocols that support "updates," modified cache lines can be pushed out to the interested readers rather than just invalidated and then requested by the readers. In this model of cache coherency, a polling reader may not need to repeatedly request data from the writer through the data fabric. However, if the protocol design necessitates that the writer gain some sort of special state that the reader, by the very act of initiating a read, subsequently alters, then the "update" case is no different than the "invalidate" case: traditional prefetch mechanisms are ineffective and the writer is forced to incur undesirable coordination overhead associated with regaining the special state for its local copy of the cache line whenever the it needs to write to a cache line. The disclosed technology can be adapted to address this "updated-based" implementation of cache coherency in addition to the "invalidate-based" implementation discussed at greater length herein.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

FIG. 1 illustrates an overview of a conventional computer architecture 100 in which first and second CPUs 110 and 120 can exchange data using a point-to-point processor interconnect or "data fabric" 130a. Each of the first and second CPUs 110 and 120 may have a respective memory bank 112 and 122. The first CPU 110 communicates with a field-programmable gate array (FPGA) 140. The second CPU 120 communicates with a digital signal processor (DSP) or an application-specific integrated circuit (ASIC) 150. In addition to the components shown in FIG. 1, the conventional computer architecture can include some or all of the components of computing device 1200 shown in FIG. 12.

In computing systems, such as a computing system having the architecture shown in FIG. 1, devices 110 and 120 can exchange data using shared memory. For example, in a common data exchange scheme, data is read and written to an agreed memory location. The writer indicates that the data is ready to be read by setting a flag in the shared memory. The reader polls the flag to determine if it is safe to read the data. Accordingly, a typical data transfer may first include making data available to write. Next, the writer ensures that it has the only writeable copy of the cache line. For example, the writer can request an exclusive copy of the cache line from a device that can grant an exclusive copy. Alternatively, the writer can request an exclusive copy of the cache line from a directory that arbitrates such requests. Subsequently, after ensuring that it has the exclusive copy of the cache line, the writer can proceed with the data write. Finally, because the reader is constantly polling, soon after the write is complete, the just-written data is shipped to the reader such that the reader and writer have shared copies.

Figure 2:
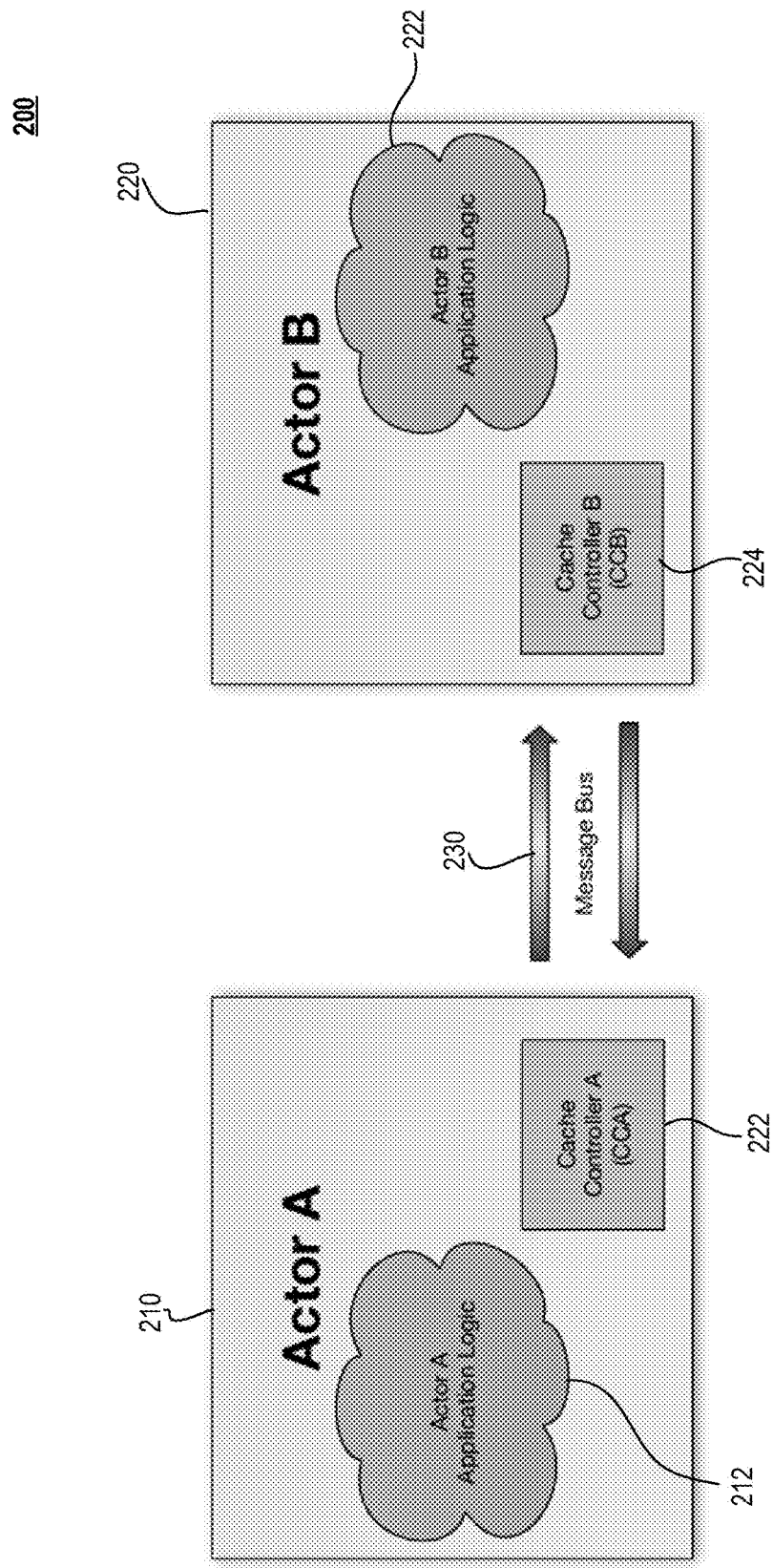
FIG. 2 depicts a two-actor cache-coherent computer system. Each actor has discrete logic, local cache memory, and a cache controller which, among other things, governs how local logic accesses memory.

FIG. 2 illustrates an overview of an implementation of a cache coherent system with two actors connected by a message bus. For the purpose of the FIG. 2 overview, assume that Actor A 210 is operating as a data reader and Actor B 220 is operating as a data writer. According to the illustrated implementation, when application logic 212 in Actor A 210 wishes to read a particular piece of memory, it makes a request to its local cache controller 214 ("CCA"). If Actor A 210's local cache is in a valid state, the cache controller 214 simply returns to the requesting logic the data held in that local cache. The process incurs minimal latency as there is no need to traverse an inter-actor message bus 230 to retrieve any data; the data required by Actor A 210's application logic 212 is already cached locally in Actor A 210. If, however, CCA 214 determines that the data residing in local cache is marked as invalid and thus potentially stale, CCA 214 must send a request across the message bus 230 to Actor B 220's cache controller 224 ("CCB") in order to get access to the most up-to-date value of the data mapped to the requested memory location. In contrast to the original case in which the data already resides in Actor A 210's cache, the time that elapses between when Actor A 210's application logic requests data and when it receives that data is materially increased due to the latency incurred by having to read data from Actor B 220's copy of memory rather than Actor A 210's own local copy.

As will be appreciated by one of skill in the art, a second factor when considering latency inherent in cache coherency-based communications schemes relates to the data writing side of the system. Again, referring to FIG. 2, which assumes that Actor A 210 is the reader and Actor B 220 is the writer for some set of events, application logic 222 in Actor B 220 also faces variable latency regarding the amount of time it takes to write data to the system depending on the state of its local cache. When Actor B 220's application logic 222 wishes to write new data to memory, it may do so by, for example, writing it to its local cache. Before the logic is permitted to write the data, however, its local cache controller, CCB 224, must determine whether or not the local cache memory is in M or E state. In the event the local cache is in M or E state, data can be written to memory immediately. If, however, CCB 224 determines that Actor B 220's local cache is not in M or E state, CCB 224 must send a message across the message bus 230 to CCA 214 requesting that CCB 224 gain control of the particular region of memory that the Actor B 220's application logic 222 wishes to write to.

Thus, in order for Actor B 220 to write to that region of memory in its local cache, several events must transpire. First, CCB 224 must send a control request to CCA 214. Second, CCA 214 must receive that request and mark Actor A 210's copies of the requested memory addresses as invalid to prevent Actor A 210's application logic 212 from potentially reading stale data. Third, CCA 214 must send an acknowledgment to CCB 224 that CCA 214 has indeed marked Actor A 210's copy of designated memory addresses as invalid. Finally, CCB 220 must receive CCA 210's acknowledgement message before it finally allows Actor B 220's application logic 222 to write the data to local memory. In sum, unless the memory location that Actor B 220's application logic 222 wishes to update with new data is already in M or E state, CCB 224 must undertake a time-consuming message passing exercise with CCA 214 to ensure that (i) Actor A 210's copy of the relevant memory location has been marked as invalid with respect to Actor A 210's potential reads and writes and (ii) CCB 224 has received acknowledgment from CCA 214 that CCA 214's copy of the memory block has been marked invalid at which time CCB 224 is able to mark the relevant cache lines in Actor B 224's cache as having M or E state and thus available for Actor B 220's writes.

In some instances, the application logic 222 in Actor B 220, periodically, but unpredictably, has new data that should be made available to Actor A 210's application logic 212 as quickly as possible. As shown in the preceding discussion, in the sample cache coherent system considered here, two time-consuming processes relating to CCA 214 and CCB 224 coordination must be undertaken before the updated data is made available to Actor A 210's logic 212. First, CCB 224 must ensure that Actor B 220 has obtained exclusive rights to write to a designated region of its local cache memory; in other words, CCB 224 must send a message to CCA 214 and wait for an affirmative response before it can put Actor B 220's designated cache lines into E or M state (so Actor B 220 is permitted to write to its local memory). Second, even after Actor B 220 has written to its local cache memory, considerable time may elapse before CCB 224 happens to receive a read request made on Actor A 210's behalf. As discussed above, when Actor B 220 has obtained exclusive rights to write to the designated region, application logic 212 in Actor A 210 will only get access to the new data when CCA 214 sends a read request to CCB 224 having recognized that Actor A 210's local copy of a region of memory is invalid (a function of CCB 224's earlier procedure of gaining E or M state for Actor B 220's relevant cache lines), thus requiring CCA 214 to reach out to Actor B 220. To the extent Actor B 220 has written the new data to Actor B 220's local cache, CCB 224 can then respond to CCA 214's read request by responding with the new data into the read response message.

The methods described in this disclosure function to lower the overall Observed Latency that arises when the writer has data which the developer wishes to be made available to the reader in two ways. In some embodiments, the disclosed systems and methods avoid contribution to latency arising out of the coordination overhead associated with CCB 224 gaining E or M state for Actor B 220 by having CCB 224 optimistically request E or M state for a designated region of memory prior to Actor B 220's application logic 222 actually having new data it wishes to write to memory. In this way, Actor B 220 can write data to its local cache the moment the data is made available to the application logic 222 without having to wait to first gain write permission to its local memory.

In some embodiments, the disclosure details how the Reader's (Actor A 210) cache controller 214, in the foregoing example, might optimistically poll the Writer's (Actor B 220) cache controller 224, for any new data in a designated region of memory in Actor B 220's cache. In many cases, CCB 224 may recognize that there is no new data at the time the read request from CCA 214 arrives. However, by holding on to CCA 214's read request and not responding immediately, CCB 224 has a high probability of being able to respond to the read request with new data in Actor B 220's cache that was written some time after the read request arrived. In this way, CCB 224 has an opportunity to transfer to CCA 214, and thus Actor A 210's application logic 212, new data as soon as it is written to Actor B 220's cache rather than having to wait for a new read request to arrive from CCA 214 some time after new data is written to Actor B 220's cache. To avoid destabilizing the system, in some implementations, even in the absence of new data, CCB 224 will be forced to periodically respond to CCA 214's read request and simultaneously relinquish the E or M state on the designated region of Actor B 220's memory. In such implementations, as discussed in this disclosure, the system is designed wherein CCB 224 may again proactively reacquire write permissions for Actor B 220 and optimistically hold a subsequent read request generated from CCA 214 which has been instructed to poll CCB 224 with read requests.

While the foregoing discussion is based on Actor B 220 only writing to its local caches, one of ordinary skill will recognize that implementations of the disclosed technology can make use of "write-through," wherein Actor B 220 sets a cache line to E or M in another device (e.g., Actor A 210), such as a system's main memory, and simultaneously changes its local cache to invalid. As will be appreciated by one of skill in the art, any variations needed to adapt the disclosed technology to this write-through approach will be readily apparent in light of the present disclosure.

Figure 3:
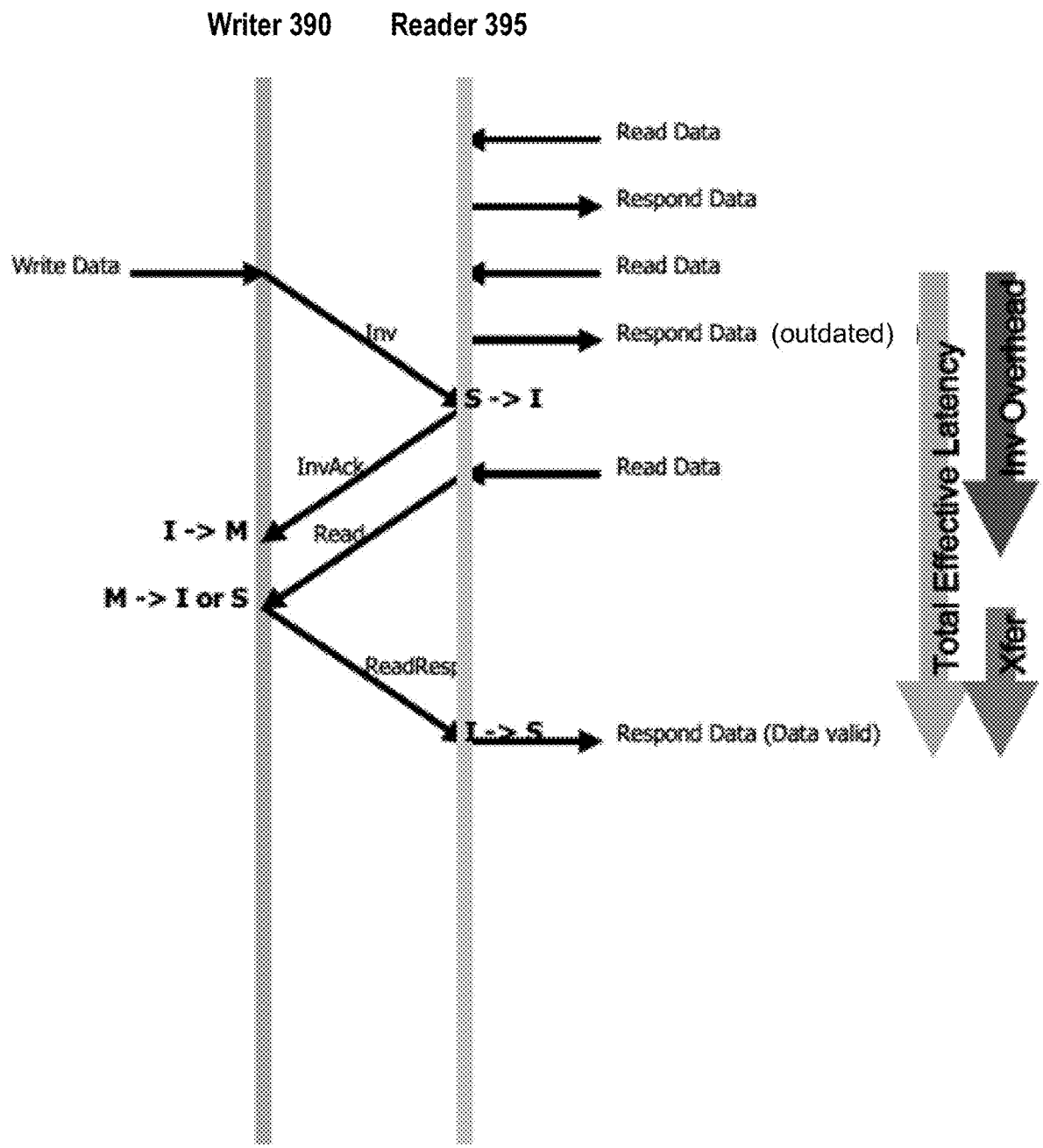
FIG. 3 is a timing diagram illustrating the latency incurred by a write from an uninitialized state.

FIG. 3 is a timing diagram 300 of a data transfer in the related art where the reader is polling a pre-determined memory location waiting for the writer to write useful data. Classic examples of this workflow include, but are not limited to, spin locks, semaphores, ring buffers and indicator flags. The two vertical lines represent timelines where events occur from top to bottom. Horizontal arrows that point to the two vertical lines with a single unconnected end indicate internal actions taken and responses received by the writer and reader internally. The diagonal arrows situated between the two timelines illustrate messages passed between the reader and writer, which traverse the data fabric and incur some propagation delay. The delays may not be deterministic or symmetric, however for illustrative purposes it is assumed to be so.

In FIG. 3, reader 395 twice polls its local copy ("Read Data") and receives an immediate response ("Respond Data"). At some point, writer 390 desires to modify the data ("Write Data") and send an invalidation instruction ("Inv") to reader 395. Reader 395 changes the state of its cache copy from shared ("S") to Invalid ("I"), and sends an invalidity acknowledgement ("InvAck") to writer 390. Writer 390 may then update its local copy of the data, changing its state from shared ("S") or invalid ("I") to modified ("M"). The time it takes between the write data command and the invalidity acknowledgement ("Inv Overhead") is at least twice the fabric delay (i.e., twice the time required to move data between the writer 390 and the reader 395 connected via the data fabric).

At some point while reader 395's copy is invalid, reader 395 polls its local copy ("Read Data"). Reader 395 then requests an update from writer 390 ("Read"). When received, writer 390 persists its local copy (e.g., changing the state from M to I or S), and transfers the updated copy to reader 395 ("ReadResp"). Reader 395 updates its local copy and sets the flag from I to S. The time from writer 390 receiving the read request from reader 395 to updating reader's local copy ("Xfer") is at least equal to the fabric delay. Although as illustrated writer 390 awaits a read request from reader 395 to update reader 395's copy of the data, this is merely an example and, in some cases, writer 390 may release the data and update reader 395's copy of the data as soon as writer 390's local copy is updated. Furthermore, as the data is ready to be updated at least one fabric delay before reader 395's cache line is notified, reader 395's local copy may return an outdated read.

As a non-limiting example, if the fabric delay is 200 nanoseconds (ns), then the Observed Latency (i.e., the time between the write data command from writer 390 and updating the reader 395 copy) is at least 600 ns (i.e., 3*200-ns) of which 400 ns (i.e., 2*200-ns) is due to the act of acquiring M or E state (i.e., "coordination delay" represented by "Inv Overhead" in the figure) and 200-ns is due to actual data transfer from writer 390 to reader 395 (i.e., "Xfer" in the figure) between the writer's and the reader's local cache lines. Note that the 600 ns value assumes that the gap between the "Inv Overhead" and the "Xfer" is at its theoretical minimum of zero, though the figure, for illustrative purposes, shows a small gap of time (e.g., to account for write times of writer 390, and/or any processing delays of writer 390 or reader 395).

Figure 4:
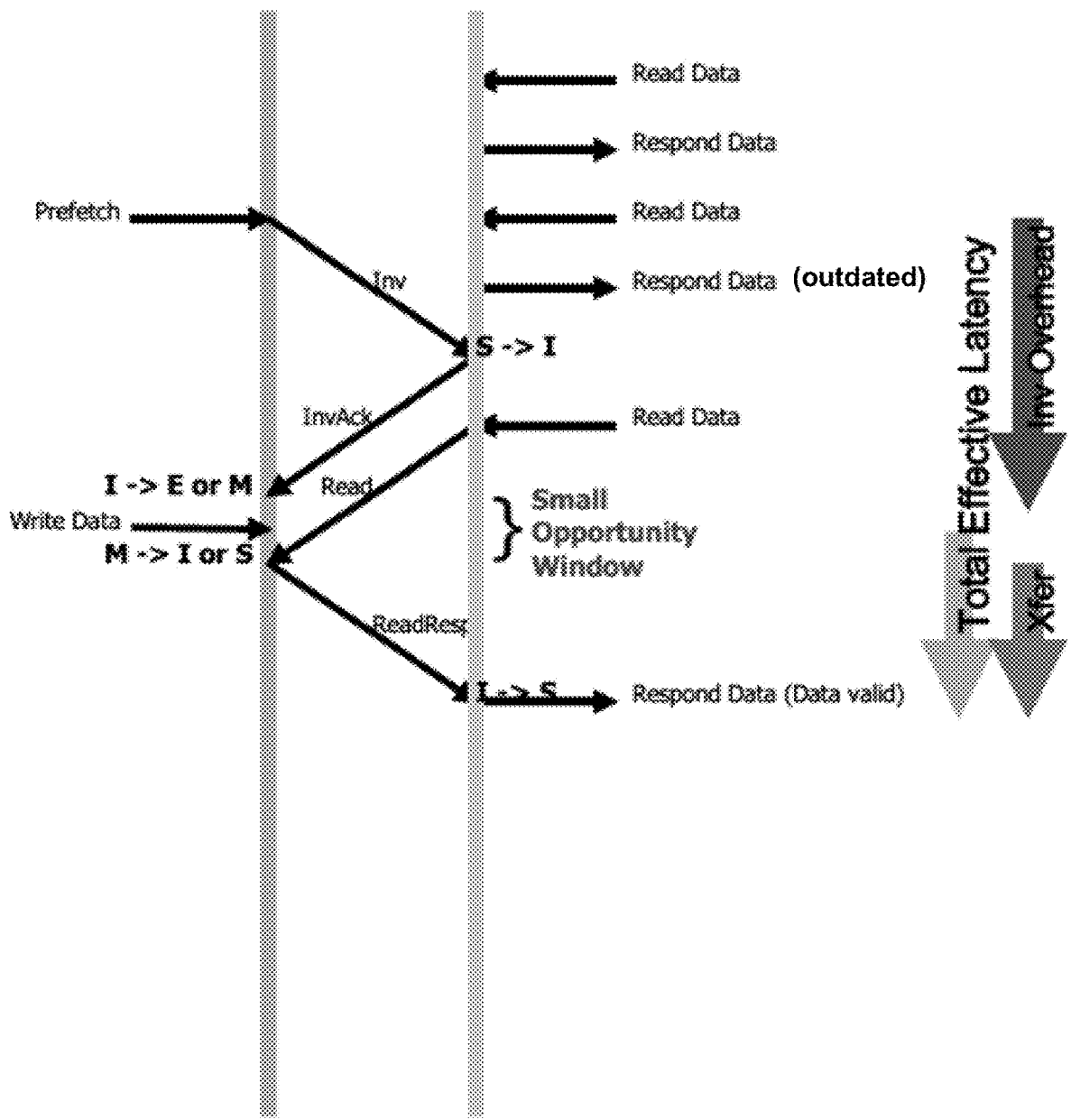
FIG. 4 is a timing diagram illustrating the latency incurred by a write where speculative and pre-emptive invalidation (i.e., write prefetch) was initiated by the writer prior to the write and successfully utilized to reduce Observed Latency by hiding coordination overhead.

As shown in timing diagram 400 of FIG. 4, it is possible to hide some or all of the coordination overhead, by speculatively and pre-emptively acquiring M or E state for the writer's local copy of the cache line; the writer 490 prefetches ("Prefetch") control of the cache line prior to the point ("Write Data") at which data is ready to be written. As can be seen in FIG. 4, such prefetching of M or E state can allow a write request to proceed almost immediately from the time data is ready to be written if the write happens to occur while the writer 490's local copy of the cache line is in E or M state because the invalidity overhead occurs before the data is ready to be written. In FIG. 4, the Observed Latency is almost entirely composed of the delay incurred by actual data transfer between the writer 490's and the reader 395's local cache lines (e.g., the fabric delay). Again, assuming a 200-ns delay in traversing the data fabric, the Observed Latency is 200-ns. However, because the reader 395 is constantly polling, the window of opportunity is very small and therefore rarely utilized meaning the odds of achieving the 200-ns Observed Latency is small. When reader 395 requests the data ("Read"), writer 490 may release its hold on the data (M→I or S) and update reader 390's local copy ("ReadResp").

Figure 5:
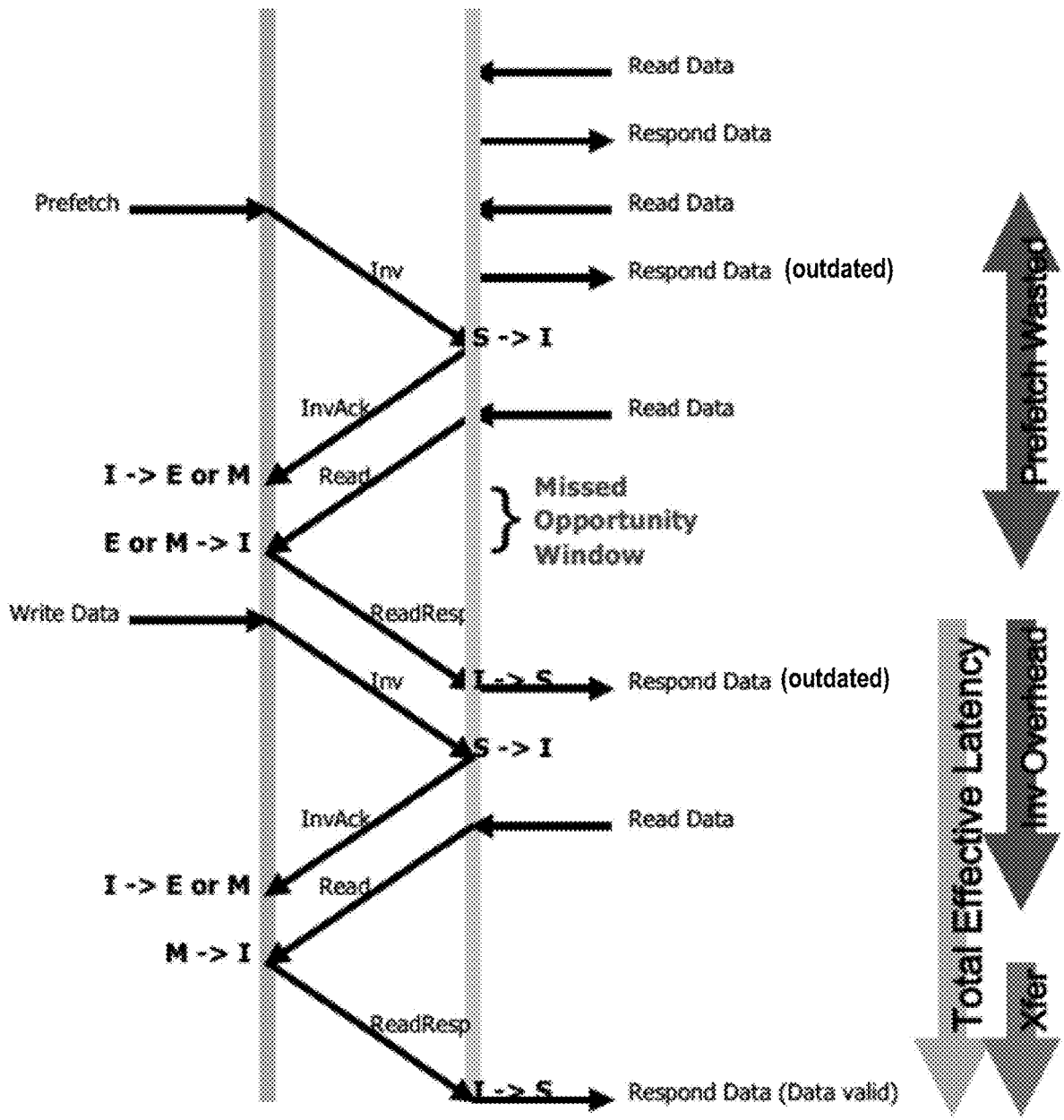
FIG. 5 is a timing diagram illustrating the latency incurred by a write where speculative and pre-emptive invalidation (i.e., write prefetch) was initiated by the writer prior to the write, but not successfully utilized therefore failing to reduce Observed Latency.

FIG. 5 provides a timing diagram 500 illustrating a more likely outcome wherein a write misses the window of opportunity between the prefetching and the read request. As in FIG. 4, writer 490 prefetches control of the cache line prior to the point at which data is ready to be written. However, prior to the point ("Write Data") at which data is ready to be written, writer 490 receives a read request ("Read") from reader 395. Writer 490 releases the cache line (E or M→I) and notifies reader 395 ("ReadResp"). After releasing the cache line (E or M→I), writer 490 desires to update the data ("Write Data"). Accordingly, in this case, writer 490 is unable to hide the coordination overhead ("InvOverhead"), such that (in the example of 200-ns fabric delay) the 200-ns Observed Latency is not achievable, and the Observed Latency reverts to a value equal or greater than 600 ns. FIG. 5, then, demonstrates how a related art prefetch often goes unutilized (and Observed Latency receives no benefit) for most workflows because the likelihood that a write occurs during the small window of opportunity is low.

Figure 6:
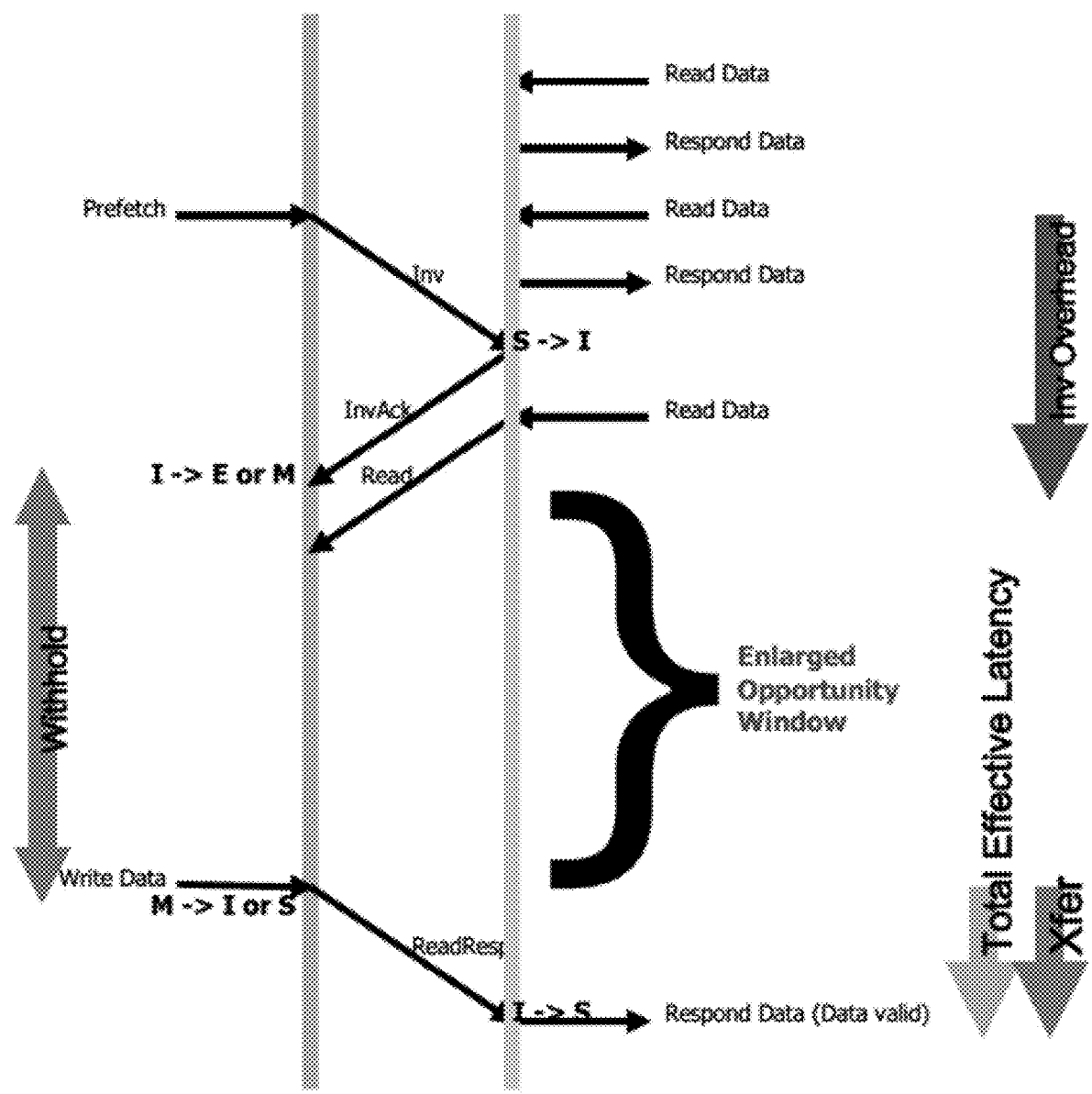
FIG. 6 is a timing diagram illustrating the enlarged window of opportunity for a successful write prefetch as a result of the writer unilaterally withholding the response to a read request.

In aspects of the disclosed technology, writer 690 unilaterally withholds the read response, thereby increasing the likelihood that when writer 690 wants to write, writer 590 does not have to incur the coordination overhead (of at least two times the fabric delay) associated with gaining E or M state in its local copy of the cache line, Observed Latency could be reduced. FIG. 6 presents a timing diagram 600 depicting a scenario of writer 690 enlarging an opportunity window. Referring to FIG. 6, writer 690 prefetches ("Prefetch") control of the cache line prior to the point ("Write Data") at which data is ready to be written. Like in FIG. 5, prior to the point ("Write Data") at which data is ready to be written, writer 690 receives a read request ("Read") from reader 395. Unlike in FIG. 5, writer 690 withholds a response to the read request, enlarging the opportunity window. Accordingly, when writer 690 desires to update the data ("Write Data"), writer 690 may proceed with writing data without having to acquire control of the cache line (i.e., because it was prefetched).

Figure 7:
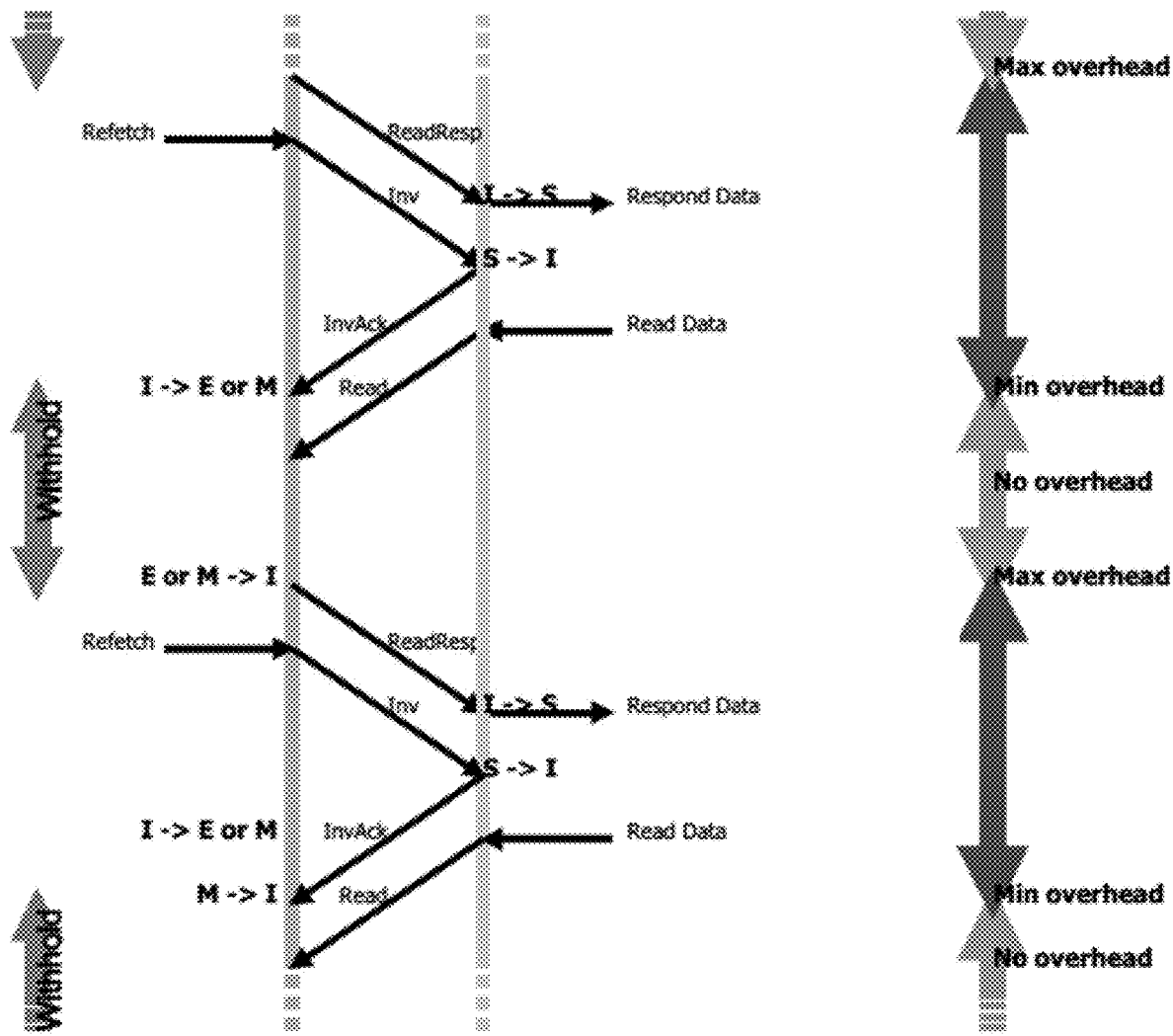
FIG. 7 is a timing diagram illustrating the increase in probability of only incurring a reduced or non-existent coordination overhead when the writer wants to write using the response withhold and re-initiated invalidation (i.e., "write refetch") principles according to the present disclosure.

As will be appreciated, writer 790 cannot withhold read responses indefinitely, however, because reader 395 will assume that some critical error, such as one arising from a defective component, has occurred after a timeout period (i.e., when writer 790 does not respond within some predetermined amount of time). Accordingly, writer 790 must respond to the reader before such a timeout is reached and relinquish M or E state in its local copy of the cache line. However, writer 790 can immediately re-initiate the prefetching invalidation process (i.e., "refetch") and regain the very E or M state in the local copy that it had just relinquished. FIG. 7 presents a timing diagram 700 depicting a scenario of writer 790 repeatedly refetching its M or E state after each forced relinquishment. The dashed lines at the top and bottom of the timelines indicate this repeating scheme.

FIG. 7 also illustrates that Observed Latency (i.e., the time between a "Data Write" and updating reader 395) may be variable. Depending on the timing of the writes ("Data Write") relative to the "refetching" process, the Observed Latency includes an overhead between a theoretical maximum overhead, or "Max overhead," and a minimum overhead, or "Min overhead" (which is zero). The Observed Latency is at its maximum when the attempted write coincides with a moment in time immediately after the refetch has been initiated, and it is at its minimum in the case where the attempted write coincides with a point during which writer 790 has its local copy of the relevant cache lines in E or M state. This state exists both prior to receiving a read request ("Read") from reader 395, and while writer 790 is withholding a response ("ReadResp") from reader 395's read request. Therefore, the Observed Latency will have a certain chance of experiencing minimum overhead based on a maximum withholding time and read request frequency (i.e., how quickly after refetching writer 790 receives a read request). For a remaining time, the observed latency will have some fraction of the full coordination overhead based on when during the refetching process the write data command is received.

As an example, assuming a 200-ns delay in traversing the data fabric, a maximum withholding time of 400 ns, and an immediate polling by reader 395, writer 790 has around a 50% chance (i.e., 400 ns/(2*200-ns+400 ns)) of avoiding the coordination overhead completely and some fraction of the coordination overhead in the other 50% of cases. As another example, assuming a 200-ns delay in traversing the data fabric, a maximum withholding time of 400 ns, and polling by reader 395 on average 200-ns after refetching, writer 790 has around a 60% chance (i.e., (400 ns+200-ns)/(2*200-ns+ 400 ns+200-ns)) of avoiding coordination overhead completely and some fraction of the coordination overhead in the other 40% of cases. If writer 790 initiates a write immediately after the re-initiation of the invalidation process, writer 790 will incur the maximum amount 400 ns of the coordination overhead. If writer 790 initiates a write near the end of the invalidation process, writer 790 will incur almost no coordination overhead. If writer 790 initiates a write after the end of the invalidation process and/or while writer 790 is withholding the read response, writer 790 completely avoids the coordination overhead.

In some cases, the withholding time may be variable (e.g., between a maximum withholding period and no withholding period). For instance, if writer 790 predicts that no write data instructions will be received within the maximum withholding period from receiving the read request, writer 790 may ignore the withholding period, immediately release the local cache, and immediately respond to the read request. In some cases, historical write data and read requests may be tracked, and at least one of the refetching timing and holding periods may be adjusted. For example, if writer 790 identifies read request patterns (e.g., that they tend to come in bursts), it may delay initiating refetching until after a determined time period has elapsed after a read request. As another example, if writer 790 determines that write data commands occur very infrequently, writer 790 may halt prefetching. If write data commands later increase, writer 790 may again perform prefetching. One of ordinary skill will understand that these are merely examples, and various modifications and alternatives would be apparent in light of the present disclosure.

Figure 8:
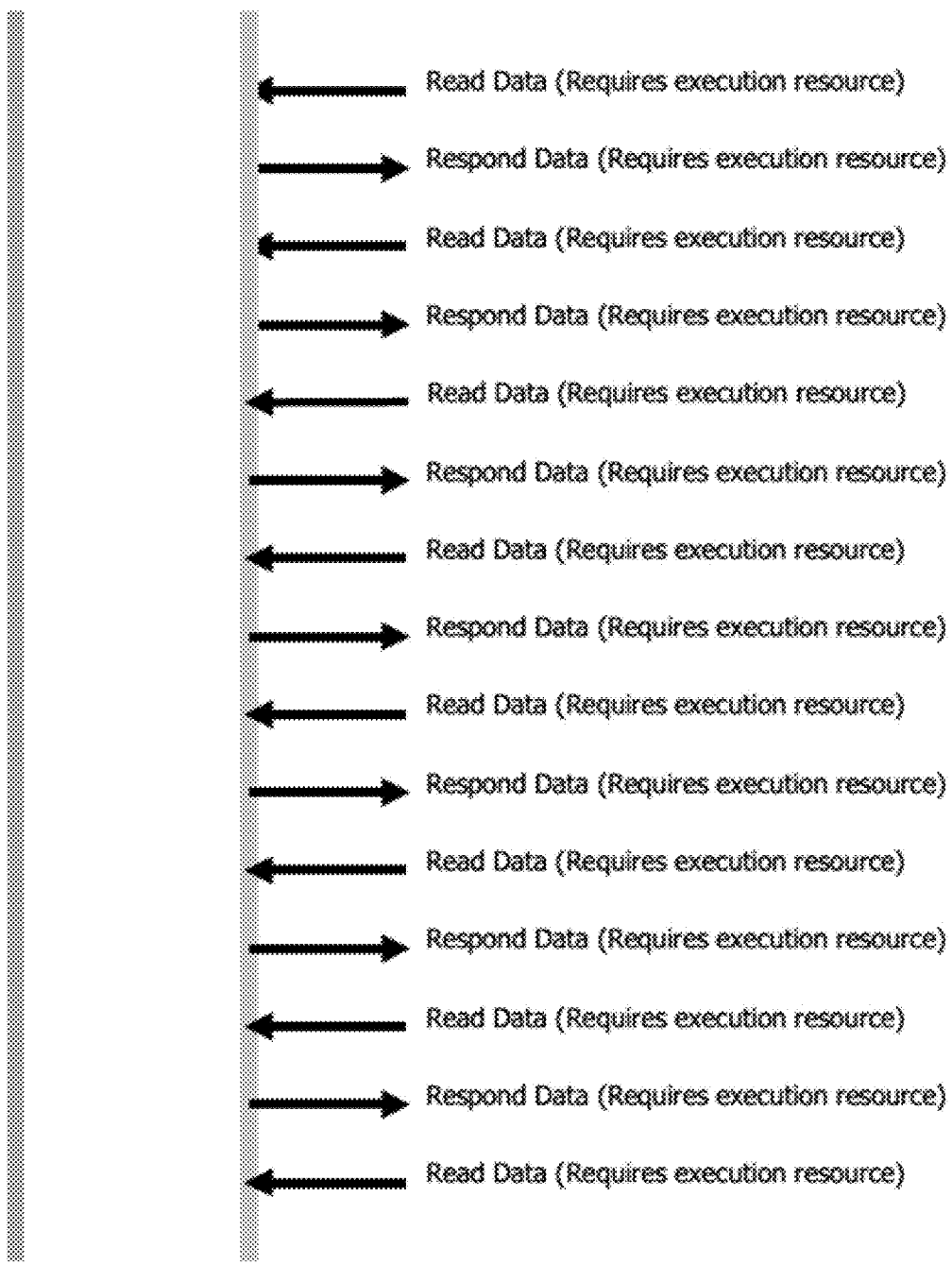
FIG. 8 is a timing diagram illustrating the useless expenditure of execution resources of a processor without the aid of the disclosed technology.
Figure 9:
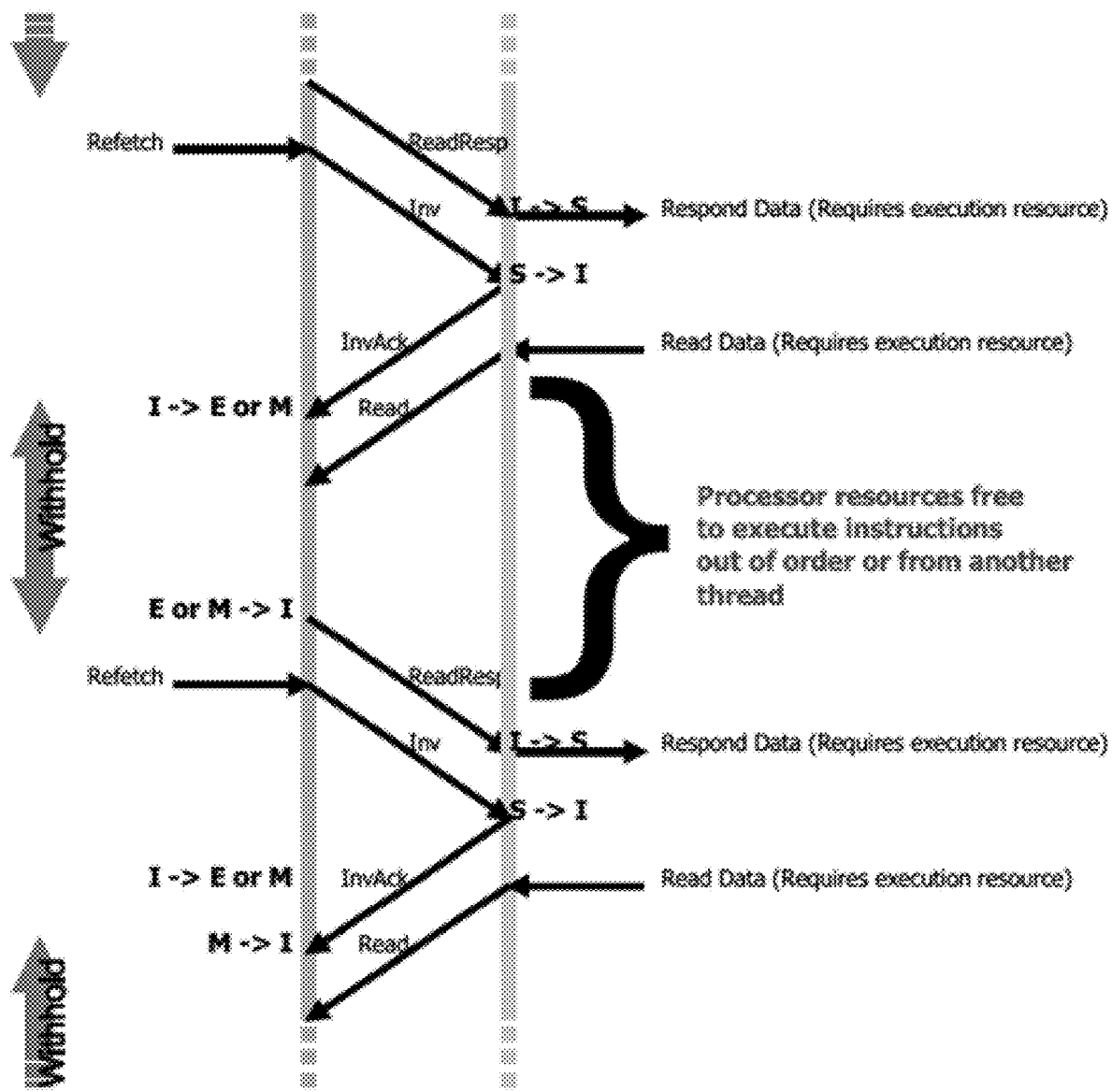
FIG. 9 is a timing diagram illustrating the reduction in useless expenditure of execution resources of a processor with the aid of the disclosed technology.

FIG. 8 is a timing diagram 800 illustrating repeated read requests of reader 395. As illustrated in FIG. 8, polling reader 395 wastes valuable resources executing useless instructions in the processor when its read requests result in responses devoid of new data. FIG. 9 is a timing diagram 900 depicting use of the certain disclosed embodiments. As illustrated in FIG. 9, execution of useless instructions is reduced because writer 990's withholding scheme obviates the need for intensive polling on the part of reader 395.

Figure 10:
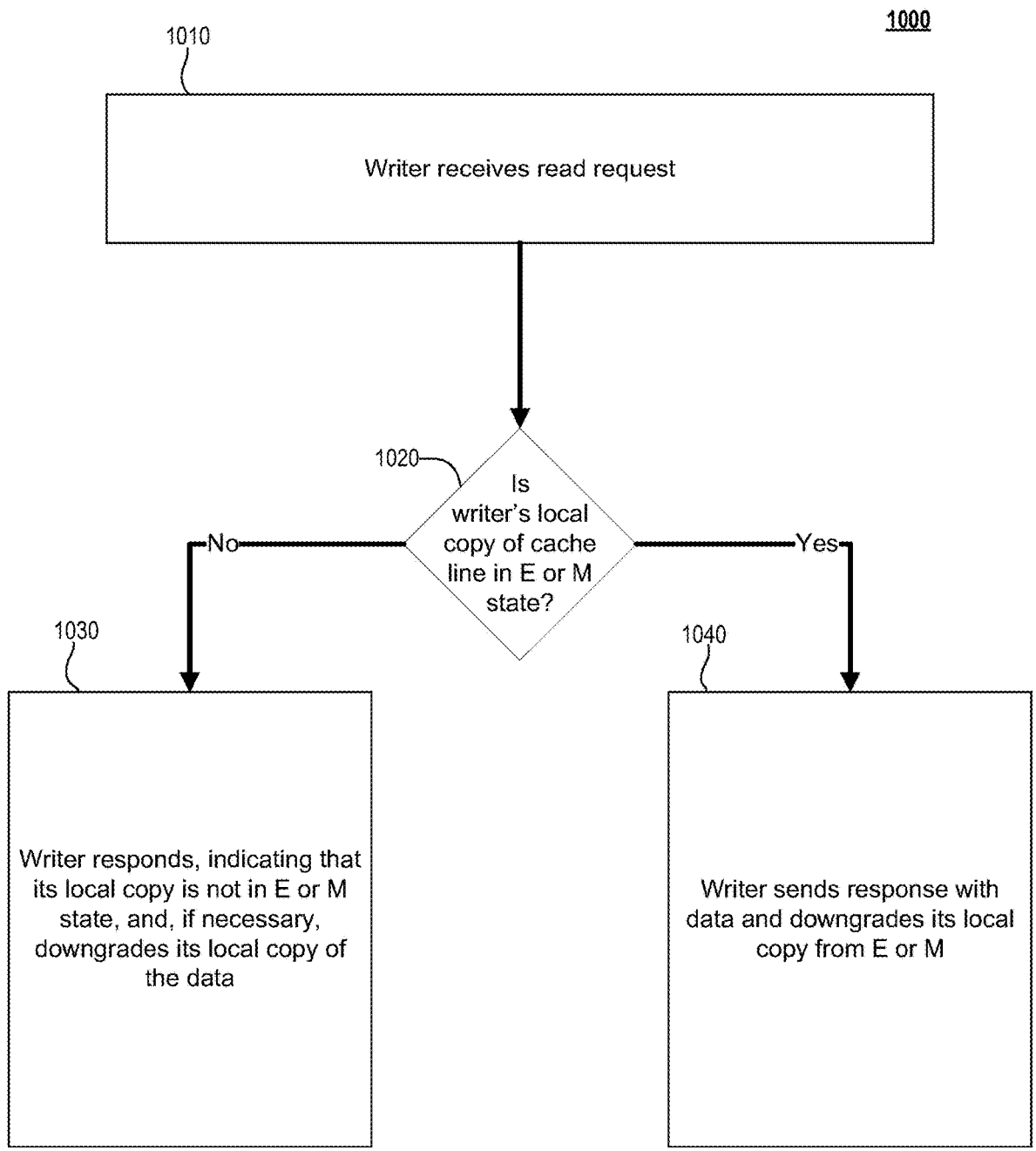
FIG. 10 is a flow diagram illustrating the actions taken by prior art when a read request is received by a writer's local cache memory.
Figure 11:
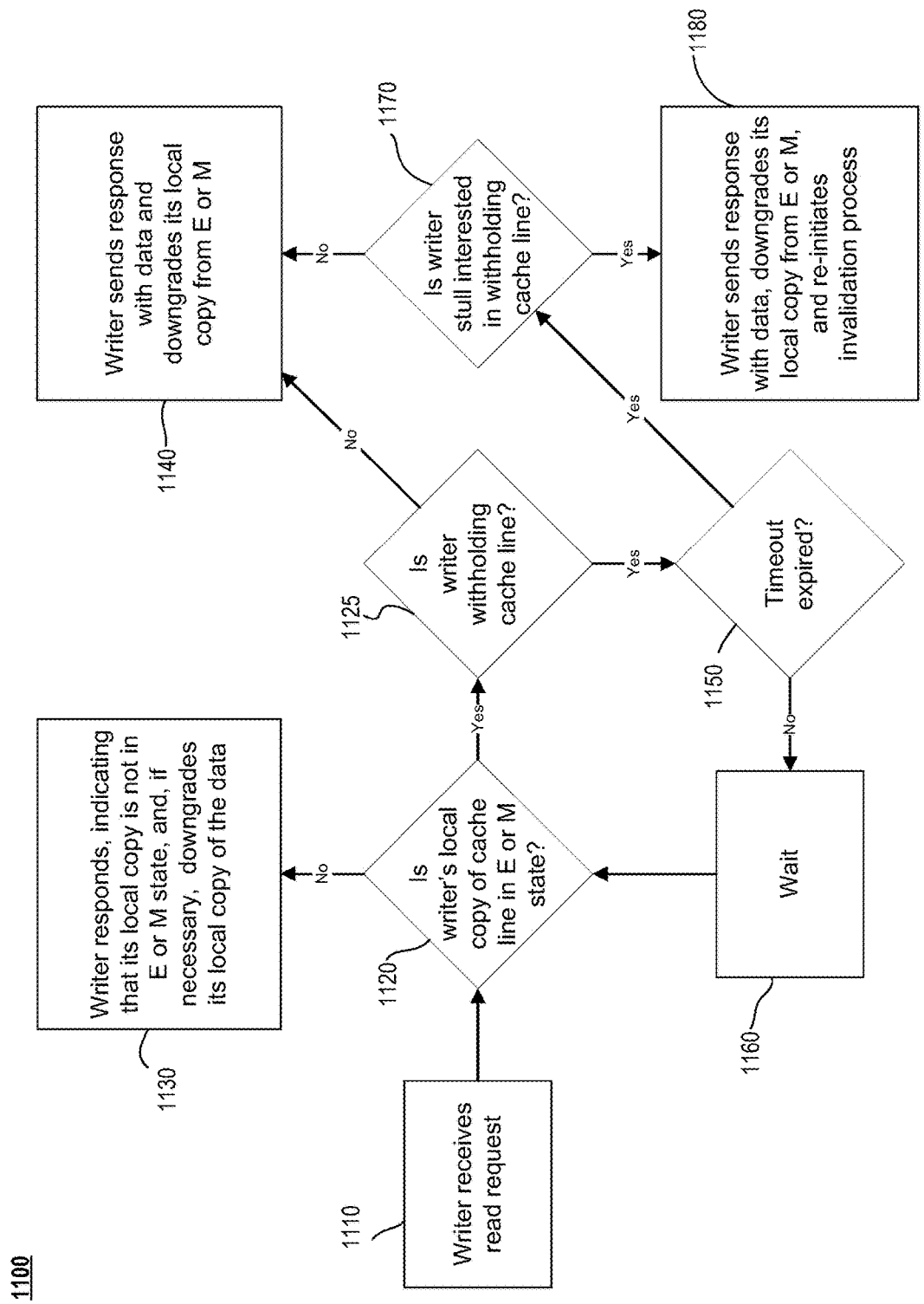
FIG. 11 is a flow diagram illustrating the actions taken by the disclosure when a read request is received by a writer's local cache memory.

FIG. 10 and FIG. 11 offer an alternative depiction of an embodiment of the disclosed technology's contrasting approach with related art implementations as it relates to writer-managed read requests. FIG. 10 is a flowchart 1000 of a related art method for writer-managed read requests. In the related art approach of FIG. 10, a writer receives 1010 a read request and responds immediately after determining 1020 whether the writer's local copy of the cache line is in E or M state. If the local copy of the cache line is not in E or M state (1020—No), the writer responds 1030 to the read request indicating that its local copy is not in the E or M state (e.g., indicating that the reader must retrieve updated data from elsewhere), and, if necessary, downgrades its local copy of the data. Meanwhile, if the local copy of the cache line is in E or M state (1020—Yes), regardless of whether there is new data to write, the writer responds 1040 to the read request with data and downgrades its local copy of its cache. As a consequence, the odds increase of the writer incurring higher Observed Latency if it attempts to write data shortly thereafter, as the cache is no longer in the E or M state (i.e., because it must refetch the cache line before writing).

FIG. 11 is a flowchart 1100 of a method of writer-managed read requests according to an example embodiment of the disclosed technology. In some cases, the writer avoids having to necessarily downgrade the state of the local copy of its cache prior to the arrival of new data by withholding read responses so that the local copy of the cache line is in E or M state for a greater period of time, allowing the writer to immediately push the new data to the reader by releasing a response to the read request after the data is updated.

In the flowchart 1100 of FIG. 11, a writer receives 1110 a read request and determines 1120 whether the writer's local copy of the cache line is in E or M state. If the local copy of the cache line is not in E or M state (1120—No), the writer responds 1130 to the read request indicating that its local copy is not in the E or M state (e.g., indicating that the reader must retrieve updated data from elsewhere), and, if necessary, downgrades its local copy of the data. Meanwhile, if the local copy of the cache line is in E or M state (1120—Yes), the writer determines 1125 whether the cache line is being withheld. If the cache line is not being withheld (1125—No), regardless of whether there is new data to write, the writer responds 1140 to the read request with data and downgrades its local copy of its cache.

Meanwhile, if the cache line is being withheld (1125—Yes), the writer determines 1150 whether a timeout has expired. For example, in some cases a response to a read request may only be withheld for a set period of time (e.g., twice a fabric delay) before the requesting reader believes a problem has occurred. If the timeout has not expired, the writer waits 1160. Once the timeout expires, the writer may again determine 1120 whether the local copy of the ache line is in E or M state. However, this is merely an example and, in some instances, after the writer waits 1160 for the timeout to expire, it may proceed with determining 1170 whether the writer is still interested in withholding the cache line. Similarly, if the timeout has expired (1150—Yes), the writer determines 1170 whether the writer is interested in withholding the cache line. If the writer is not interested (1170—No), the writer responds 1140 to the read request with data and downgrades its local copy of its cache. Meanwhile, if the writer is still interested in withholding the cache line (1170—Yes), the write send 118—a response to the reader with data, downgrades its local copy from E or M, and re-initiates the invalidation process (e.g., in order to hold the local copy of the cache line in E or M state). As a consequence of the withholding, the odds increase of the writer incurring lower Observed Latency if it attempts to write data shortly after receiving the read request, as the cache continues to be in the E or M state.

By combining (i) a writer's prefetching of cache lines with (ii) its withholding of read requests, aspects of the disclosed technology offer a means by which the Observed Latency of data transfer in cache coherent systems can be meaningfully reduced.

Figure 12:
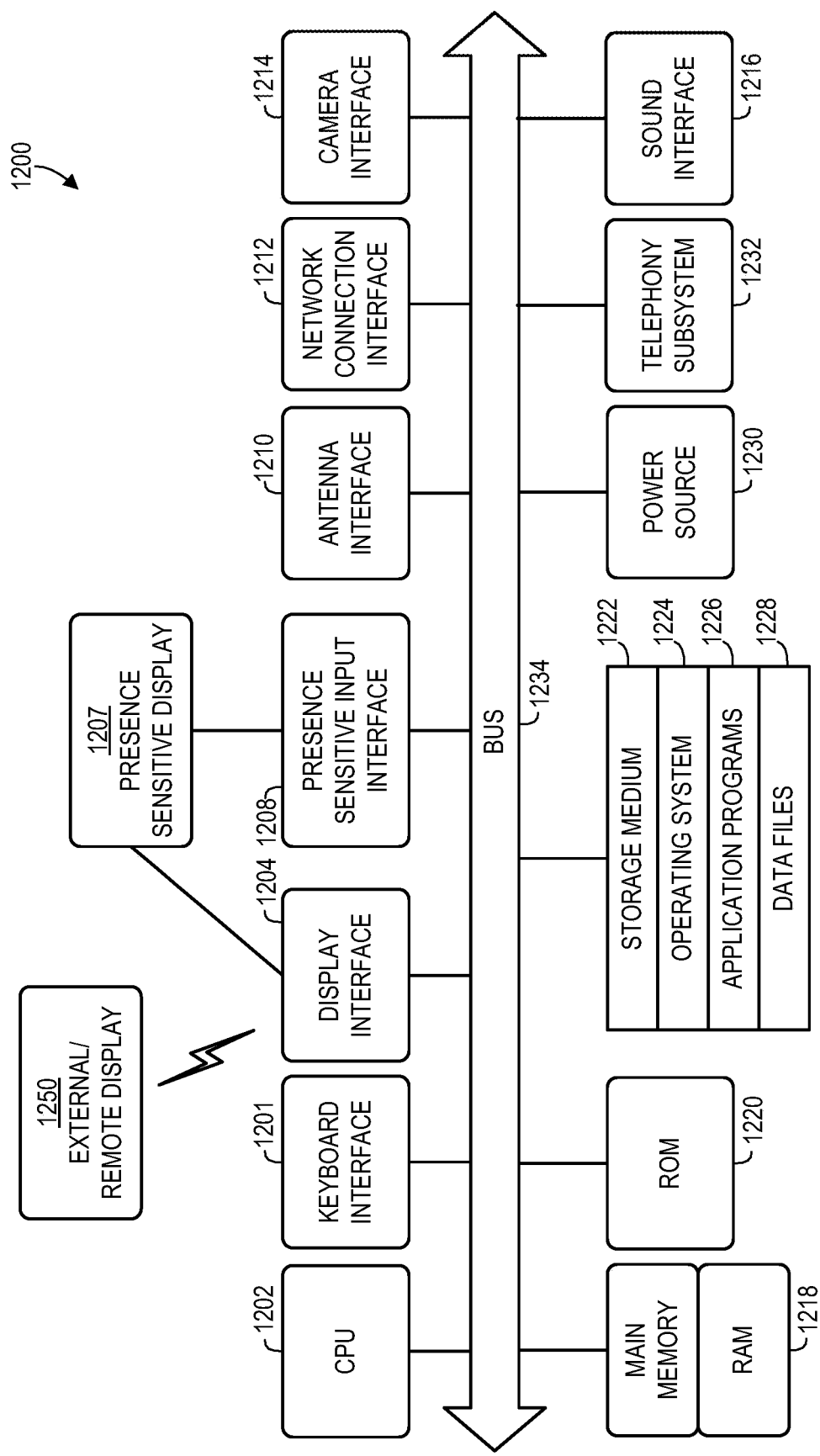
FIG. 12 is a block diagram of an illustrative computer system architecture 1200, according to an example implementation.

Aspects of the disclosed technology may be implementing using at least some of the components illustrated in the computing device architecture 1200 of FIG. 12. As shown, the computing device architecture includes a central processing unit (CPU) 1202, where computer instructions are processed; a display interface 1204 that acts as a communication interface and provides functions for rendering video, graphics, images, and texts on the display. In certain example implementations of the disclosed technology, the display interface 1204 may be directly connected to a local display, such as a touch-screen display associated with a mobile computing device. In another example implementation, the display interface 1204 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 1204 may wirelessly communicate, for example, via a Wi-Fi channel or other available network connection interface 1212 to the external/remote display.

In an example implementation, the network connection interface 1212 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1204 may be operatively coupled to a local display, such as a touch-screen display associated with a mobile device. In another example, the display interface 1204 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 1204 may wirelessly communicate, for example, via the network connection interface 1212 such as a Wi-Fi transceiver to the external/remote display.

The computing device architecture 1200 may include a keyboard interface 1206 that provides a communication interface to a keyboard. In one example implementation, the computing device architecture 1200 may include a presence-sensitive display interface 1208 for connecting to a presence-sensitive display 1207. According to certain example implementations of the disclosed technology, the presence-sensitive display interface 1208 may provide a communication interface to various devices such as a pointing device, a touch screen, a depth camera, etc. which may or may not be associated with a display.

The computing device architecture 1200 may be configured to use an input device via one or more of input/output interfaces (for example, the keyboard interface 1206, the display interface 1204, the presence sensitive display interface 1208, network connection interface 1212, camera interface 1214, sound interface 1216, etc.) to allow a user to capture information into the computing device architecture 1200. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1200 or may be a separate device. For example, the input device may be an accelerometer, a magnetometer, a digital camera, a microphone, and an optical sensor.

Example implementations of the computing device architecture 1200 may include an antenna interface 1210 that provides a communication interface to an antenna; a network connection interface 1212 that provides a communication interface to a network. As mentioned above, the display interface 1204 may be in communication with the network connection interface 1212, for example, to provide information for display on a remote display that is not directly connected or attached to the system. In certain implementations, a camera interface 1214 is provided that acts as a communication interface and provides functions for capturing digital images from a camera. In certain implementations, a sound interface 1216 is provided as a communication interface for converting sound into electrical signals using a microphone and for converting electrical signals into sound using a speaker. According to example implementations, a random-access memory (RAM) 1218 is provided, where computer instructions and data may be stored in a volatile memory device for processing by the CPU 1202.

According to an example implementation, the computing device architecture 1200 includes a read-only memory (ROM) 1220 where invariant low-level system code or data for basic system functions such as basic input and output (I/O), startup, or reception of keystrokes from a keyboard are stored in a non-volatile memory device. According to an example implementation, the computing device architecture 1200 includes a storage medium 1222 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1224, application programs 1226 (including, for example, a web browser application, a widget or gadget engine, and or other applications, as necessary) and data files 1228 are stored. According to an example implementation, the computing device architecture 1200 includes a power source 1230 that provides an appropriate alternating current (AC) or direct current (DC) to power components.

According to an example implementation, the computing device architecture 1200 includes and a telephony subsystem 1232 that allows the device 1200 to transmit and receive sound over a telephone network. The constituent devices and the CPU 1202 communicate with each other over a bus 1234.

According to an example implementation, the CPU 1202 has appropriate structure to be a computer processor. In one arrangement, the CPU 1202 may include more than one processing unit. The RAM 1218 interfaces with the computer bus 1234 to provide quick RAM storage to the CPU 1202 during the execution of software programs such as the operating system application programs, and device drivers. More specifically, the CPU 1202 loads computer-executable process steps from the storage medium 1222 or other media into a field of the RAM 1218 in order to execute software programs. Data may be stored in the RAM 1218, where the data may be accessed by the computer CPU 1202 during execution. In one example configuration, the device architecture 1200 includes at least 128 MB of RAM, and 256 MB of flash memory.

The storage medium 1222 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1222, which may comprise a machine-readable storage medium.

According to one example implementation, the term computing device, as used herein, may be a CPU, or conceptualized as a CPU (for example, the CPU 1202 of FIG. 12). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain embodiments of the disclosed technology are described above with reference to block and flow diagrams of systems and/or methods according to example embodiments of the disclosed technology. Some blocks of the block diagrams and flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for reducing observed write transaction latency of a writer in a cache coherent shared memory system, the method comprising:
   pre-emptively invalidating a cache line;
   receiving a read request for the invalidated cache line;
   temporarily withholding a response to the read request;
   responding, after temporarily withholding the response, to the read request; and
   pre-emptively re-invalidating the cache line after responding to a read request.

2. The method of claim 1, wherein temporarily withholding the response to the read request comprises withholding the response until the writer writes fresh data to the cache line.

3. The method of claim 1 further comprising determining that the writer has interest in the cache line, wherein temporarily withholding the response to the read request comprises withholding the response until the writer indicates that it is no longer interested in the cache line.

4. The method of claim 1 further, wherein temporarily withholding the response to the read request comprises withholding the response until a timeout occurs.

5. The method of claim 4, wherein the timeout is based from a time of pre-emptively invalidating the cache line.

6. The method of claim 4, wherein the timeout is based from a time of receiving the read request.

7. The method of claim 4 further comprising aborting the timeout in response to the writer determining that a write command to the cache line is unlikely to occur during a timeout period.

8. The method of claim 4, wherein a length of the timeout is based on at least one from among a historical rate of data write commands to the cache line, a historical frequency of read requests for the cache line, and an estimated fabric delay between the writer and a reader.

9. The method of claim 1 further comprising temporarily delaying the pre-emptive re-invalidation based on historical read requests rates.

10. A method for reducing an amount of wasted work done by a reader in a cache coherent shared memory system capable of out-of-order processing polling on a cache line, the method comprising:
speculatively invalidating a cache line;
receiving, by a writer, a read request for the invalidated cache line;
withholding, by the writer, a response to the read request until a condition is met; and
speculatively re-invalidating the cache line again after responding to the read request when the condition is met.

11. The method of claim 10, wherein the condition comprises a first from among the writer writing useful data to the cache line, determining that the writer is no longer interested in holding the cache line, and a timeout occurring.

12. A system for writing to a cache line, the system comprising:
at least one processor; and
at least one memory having stored thereon instructions that, when executed by the at least one processor, controls the at least one processor to:
pre-emptively invalidate a cache line at a reader device;
receive, from the reader device, a read request for the invalidated cache line;
delay a response to the read request;
after the delay, output for transmission a response to the read request to the reader device; and
pre-emptively re-invalidate the cache line at the reader device after responding to a read request.

13. The system of claim 12, wherein the instructions, when executed by the at least one processor, further control the at least one processor to delay the pre-emptive re-invalidation based on historical read requests rates.

14. The system of claim 12, wherein delaying the response to the read request comprises delaying the response until at least one of the system writes fresh data to the cache line and the system is no longer interested in the cache line.

15. The system of claim 12, wherein delaying the response to the read request comprises delaying the response until a timeout occurs.

16. The system of claim 15, wherein the timeout is based from either a time of pre-emptively invalidating the cache line and a time of receiving the read request.

17. The system of claim 15, wherein the instructions, when executed by the at least one processor, further control the at least one processor to about the timeout in response determining that a write command to the cache line is unlikely to occur during a timeout period.

18. The system of claim 15, wherein the instructions, when executed by the at least one processor, further control the at least one processor to determine a timeout length based on at least one from among a historical rate of data write commands to the cache line, a historical frequency of read requests for the cache line, and an estimated fabric delay between the system and the reader device.

* * * * *